(12) United States Patent
Shimizu

(10) Patent No.: US 9,156,509 B2
(45) Date of Patent: Oct. 13, 2015

(54) DOOR TRANSPORTATION METHOD IN VEHICLE BODY ASSEMBLY LINE AND DOOR TRANSPORTATION DEVICE IN VEHICLE BODY ASSEMBLY LINE

(75) Inventor: Kenji Shimizu, Tsu (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 13/542,793

(22) Filed: Jul. 6, 2012

(65) Prior Publication Data

US 2013/0008763 A1     Jan. 10, 2013

(30) Foreign Application Priority Data

Apr. 14, 2011   (JP) .................................. 2011-090414

(51) Int. Cl.
*B65G 43/10*       (2006.01)
*B23P 11/00*       (2006.01)
*B62D 65/06*       (2006.01)
*B62D 65/18*       (2006.01)

(52) U.S. Cl.
CPC ................ *B62D 65/06* (2013.01); *B62D 65/18* (2013.01); *Y10T 29/49819* (2015.01)
USPC ......... 198/343.1; 198/346.2; 29/786; 29/793; 29/822; 29/823

(58) Field of Classification Search
CPC .................................................... B65G 37/005
USPC ........... 198/339.1, 343.1, 346.2, 575; 29/786, 29/793, 822, 823
See application file for complete search history.

(56) References Cited

U.S. PATENT DOCUMENTS 4,589,184 A *  5/1986  Asano et al. .................... 29/430
4,659,895 A *  4/1987  Di Rosa .......................... 219/79
(Continued)

FOREIGN PATENT DOCUMENTS

CN          1388787         1/2003
CN          1414894         4/2003
(Continued)

OTHER PUBLICATIONS

Japanese Notice of Allowance with English Translation, Application No. 2011-090414, dated May 7, 2013, 6 pages.
(Continued)

*Primary Examiner* — Douglas Hess
(74) *Attorney, Agent, or Firm* — Rankin, Hill & Clark LLP

(57) ABSTRACT

A door transportation method in a vehicle body assembly line, in which the vehicle body is placed and transported on a vehicle body transportation carriage of a floor conveyer, and thereby components are assembled to the vehicle body, includes: placing and transporting the door, which is detached from the vehicle body, on a door placing section arranged on a base stand of the vehicle body transportation carriage.

10 Claims, 4 Drawing Sheets

(56) References Cited

U.S. PATENT DOCUMENTS

| | | | |
|---|---|---|---|
| 4,736,515 A * | 4/1988 | Catena | 29/714 |
| 4,800,249 A * | 1/1989 | Di Rosa | 219/79 |
| 4,856,701 A * | 8/1989 | Pockl | 228/6.1 |
| 4,894,908 A * | 1/1990 | Haba et al. | 29/711 |
| 4,928,383 A * | 5/1990 | Kaczmarek et al. | 29/711 |
| 5,123,148 A * | 6/1992 | Ikeda et al. | 29/11 |
| 5,123,161 A * | 6/1992 | Kubo et al. | 29/784 |
| 5,577,597 A * | 11/1996 | Kakida et al. | 198/465.1 |
| 6,293,454 B1 * | 9/2001 | Zhang et al. | 228/4.1 |
| 6,643,905 B2 * | 11/2003 | Rhoads et al. | 29/407.09 |
| 6,691,392 B2 * | 2/2004 | Savoy et al. | 29/407.09 |
| 7,484,616 B2 * | 2/2009 | Nakamura | 198/465.4 |
| 7,748,514 B2 * | 7/2010 | Shimizu et al. | 198/346.1 |
| 8,353,396 B2 * | 1/2013 | Miura et al. | 198/678.1 |
| 8,474,683 B2 * | 7/2013 | Kilibarda | 228/47.1 |
| 8,485,343 B2 * | 7/2013 | Kimata | 198/465.4 |

FOREIGN PATENT DOCUMENTS

| | | |
|---|---|---|
| CN | 1689891 | 11/2005 |
| JP | 03-159886 A | 7/1991 |
| JP | 04-358976 | 12/1992 |

OTHER PUBLICATIONS

Chinese Office action dated Apr. 22, 2014 (Partial English translation included).

Chinese Office action dated May 6, 2014 (Partial English translation included).

* cited by examiner

DOOR TRANSPORTATION METHOD IN VEHICLE BODY ASSEMBLY LINE AND DOOR TRANSPORTATION DEVICE IN VEHICLE BODY ASSEMBLY LINE

BACKGROUND

1. Field of the Invention

The present invention relates to a door transportation method in a vehicle body assembly line and a door transportation device in a vehicle body assembly line.

2. Description of Related Art

In the related art, a door transportation device and a door transportation method have been disclosed including a step of detaching a door from a vehicle body after painting, transporting the door to a first door storage device using the transportation device, carrying out the door from the first door storage device to a door assembly line and assembling door component parts to the door in the door assembly line; a step of transporting the door, in which the door component parts are assembled, to a second door storage device and sending the door in the second door storage device; and a step of carrying out the door from the second door storage device, transporting the door to a door assembly place and a main body of a vehicle which completes the assembly of the parts, and assembling the door to the main body of the vehicle body (see, Japanese Unexamined Patent Application, First Publication No. H04-358976).

SUMMARY

However, in the related art described above, the step of transporting the door is required in order to transport the door to the first door storage device from the door detaching step from the vehicle body after painting. In addition, since the door is transported from the second door storage device to the vehicle body assembly line where the door is assembled in the main body of the vehicle, the door transporting step is also required.

Thus, production of a door transportation hanger and construction of the transportation conveyer are necessary, and thereby there is a problem of increased cost. In addition, there is a problem of having to secure a large space to construct the transportation conveyer.

An object of aspects according to the invention is to provide a door transportation method in a vehicle body assembly line and a door transportation device in a vehicle body assembly line in which laying space is not required, and at low cost.

Aspects of the invention employ means described below in order to achieve the object described above.

(1) According to an aspect of the invention, a door transportation method in a vehicle body assembly line is provided, in which the vehicle body is placed and transported on a vehicle body transportation carriage of a floor conveyer, and thereby components are assembled to the vehicle body, including: placing and transporting the door, which is detached from the vehicle body, on a door placing section arranged on a base stand of the vehicle body transportation carriage.

(2) The embodiment according to (1) described above, may further include: detaching the door from the vehicle body; and placing the door on the door placing section of the vehicle body transportation carriage and transporting the door to a downstream side of the vehicle body assembly line.

(3) In the aspect according to (1) or (2) described above, a door sub assembly line may be arranged near the vehicle body assembly line, and wherein the method may further include: drawing out the door which is placed and transported on the door placing section of the vehicle body transportation carriage from the door placing section; and transferring the door to a door transportation carriage of the door sub assembly line.

(4) The aspect according to any one of (1) to (3) described above, may further include: incoming and outgoing of the door placing section with respect to the base stand of the vehicle body transportation carriage by a door placing section incoming and outgoing unit.

(5) According to another aspect of the invention, a door transportation device in a vehicle body assembly line is provided, including: a pair of guide rails which is laid on both sides along a transportation direction on a lower surface of a base stand of a vehicle body transportation carriage which places and transports a vehicle body in the vehicle body assembly line, wherein a door placing section having a plurality of rollers engaging the guide rails may be arranged so as to be freely incoming and outgoing with respect to the base stand.

(6) In the aspect according to (5) described above, in the outside of the base stand, the door placing section may be configured to be displaceable to a horizontal state and a vertical state.

(7) In the aspect according to (5) or (6) described above, the door placing section may be income and outgone with respect to the base stand of the vehicle body transportation carriage by the door placing section incoming and outgoing unit.

(8) In the aspect according to any one of (5) to (7) described above, door placing section incoming and outgoing unit may operate in synchronization with the vehicle hod) transportation carriage of the vehicle body assembly line.

According to the embodiment of (1) described above, the door detached from the vehicle body can be transported by effectively using the vehicle body transportation carriage transported along the vehicle body assembly line.

Accordingly, production of the door transportation hanger for transporting the door separately and the lay of the transportation conveyer are not necessary, wide space for the lay is also not necessary, and low cost can be achieved.

In a case of (2), the door detached from the vehicle body can be transported by performing only the vehicle transportation without needing a special transportation conveyer.

In a case of (3), the door can be transferred to the door sub assembly line which is arranged near the vehicle body assembly line in a short path and quickly without needing to pass through the transportation conveyer or the like.

In a case of (4), since the door received in the door section does not protrude in the transportation direction of the vehicle body transportation carriage without interfering with the transportation of the vehicle body transportation carriage, the length of the transportation line of the existing vehicle body transportation carriage does not extend.

According to the embodiment of (5) described above, the door is received compactly by only adding a hand to the vehicle body transportation carriage and thereby it is net necessary to provide the transportation conveyer which transports the door in a long path.

In a case of (6), since the door can be in the vertical state, the work, in which the door is received in the door placing section or the door is taken out from the door placing section, is easily performed while reducing the burden on the worker.

In a case of (7), the appearing and disappearing operation of the door to the outside can be reliably performed.

In a case of (8), the appearing and disappearing operation of the door placing section by the door placing section incoming and outgoing unit does not give an adverse effect to the transportation operation of the vehicle body transportation carriage and the vehicle assembling process can be performed usually.

DESCRIPTION OF EMBODIMENTS

Next, embodiments of the invention are described based on the drawings.

Figure 1:
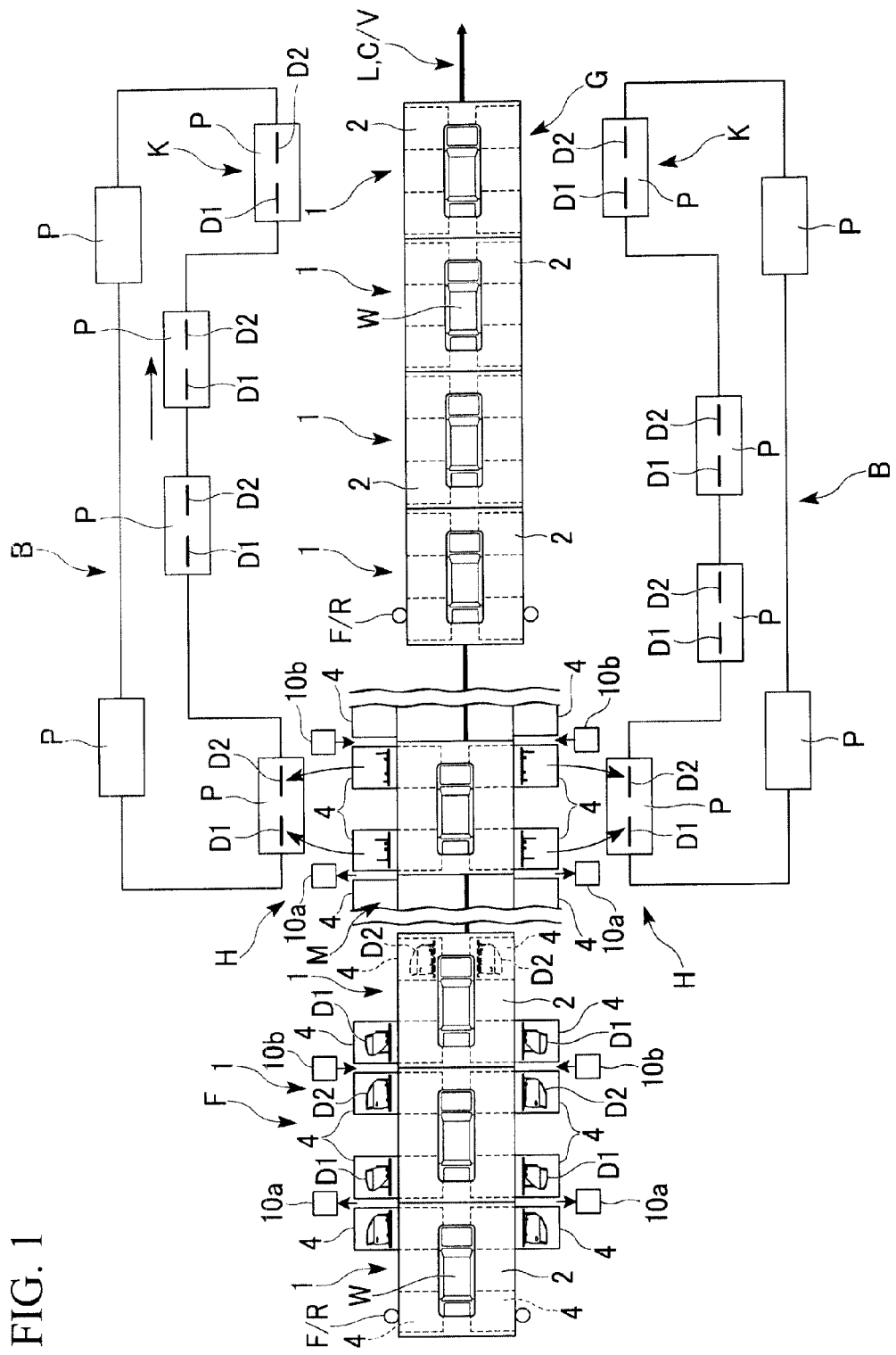
FIG. 1 is a view illustrating a vehicle body assembly line of an embodiment of the invention and is a plan view showing a cut-away portion thereof.

As shown in FIG. 1, a vehicle body W, where painting is performed in a painting line, is transported to a vehicle body assembly line L by a transportation conveyer (C/V) (floor conveyer). The transportation conveyer (C/V) is a friction conveyer using a friction roller (F/R). In the vehicle body assembly line L, the vehicle body W is placed and is transported on a transportation palette 1 (a vehicle body transportation carriage) for every vehicle body W. The vehicle body W goes up and down with a lifting device 3 (see FIGS. 3 and 4) arranged on a base stand 2 of the transportation palette 1. The vehicle body W is maintained in a lifting position that is suitable for assembling of each of parts in each of processes (each of processing sections) by the lifting device 3 and in this state, the parts are assembled to the vehicle body W.

The transportation palette 1 is formed in a rectangular shape and two door receiving sections 4 (door placing sections 4) are arranged respectively so as to be freely appearing and disappearing (freely incoming and outgoing) with respect to the base stand 2 of the transportation palette 1, at sides parallel in a transportation direction of the transportation palette 1. This forms a structure in which the door receiving section 4 of the upstream side in the transportation direction receives a rear door D1 of corresponding side and the door receiving section 4 of the downstream side in the transportation direction receives a front door D2 of the corresponding side. Accordingly, a total of four door receiving sections 4 are provided at the left and right toward the transportation direction in the upstream side in the transportation direction and at the left and right toward the transportation direction of the downstream side in the transportation direction, to the transportation palette 1.

Thus, in an initial process of the vehicle body assembly line L, the front door D2 and the rear door D1 (hereinafter, collectively referred to as the door D) are detached from the vehicle body W placed on the transportation palette 1, the door receiving section 4 is drawn out from inside the transportation palette 1, the door D is placed on the door receiving section 4 and thereby the transportation palette 1 receives the door receiving section 4.

Thus, the transportation palette 1 is transported from the upstream side to the downstream side of the vehicle body assembly line L. As described above, the assembling of required parts to the vehicle body W as described above is performed in each of processes (each of processing sections).

As the initial process of the vehicle body assembly line L, a door detaching process F is arranged and a door attaching process G is arranged near a final process of the vehicle body assembly line L.

In the middle of the vehicle body assembly line L, before the door D is transferred from the vehicle body assembly line L to a door sub assembly line B, a door drawing out process M, which draws out the door D from the door receiving section 4 of the transportation palette 1, is arranged. Both sides of the door drawing out process M, door transferring processes (a stage, a processing section) H, which transfers the door D drawn out from the door receiving section 4 in the door drawing out process M of the vehicle body assembly line L to the door palette P (a door transportation carriage), are arranged. The door transferring process H is an initial process of the door sub assembly line B approaching both sides of the door drawing out process M, and the door D is transferred in the door transferring process H.

Both sides of the door attaching process G of the vehicle body assembly line L, door transferring processes (a stage, a processing section) K, which transfer the door D from the door sub assembly line B to the vehicle body assembly line L, are arranged.

In the door detaching process F, the transportation palette 1 which reaches the process; the door receiving section 4 in the upstream side of the transportation palette 1, which reaches the process, in the transportation palettes 1 of the upstream side adjoining the transportation palette 1; and the door receiving section 4 in the downstream side of the transportation palette 1 in the upstream side are drawn out from the transportation palette 1. The rear door D1 and the front door D2 are detached from the vehicle body W respectively, and are received in the door receiving section 4 of the transportation palette 1 which is drawn out. Thus, in the next cycle, the door receiving section 4 in the upstream side of the transportation palette 1 in the downstream side, where the door receiving section 4 is drawn out and the door D is received just before; and the door receiving section 4 in the downstream side of the transportation palette 1 in the upstream side are received in the base stand 2 of the transportation palette 1. The transportation palette 1 transports the vehicle body assembly line L to the downstream side.

Thus, when the transportation palette 1 reaches (is transported) the door drawing out process M of the door sub assembly line B, the door receiving section 4 in the upstream side of the transportation palette 1 which has reached the process in the downstream side, and the door receiving section 4 in the downstream side of the transportation palette 1 in the upstream side are drawn out from the transportation palette 1. Thus, a worker draws out the door D from the door receiving section 4 and transfers the door D to a door palette P which is on standby in the door transferring process H of the door sub assembly line B and assembling of the parts to the door D is performed in the door sub assembly line B.

Thus, in the next cycle, the door receiving section 4 in the upstream side of the transportation palette 1 in the downstream side, where the door receiving section 4 is drawn out and the door D is taken out just before; and the door receiving section 4 in the downstream side of the transportation palette 1 in the upstream side are received in the base stand 2 of the transportation palette 1. The transportation palette 1 is transported to the downstream side of the vehicle body assembly line L and the assembling of the parts to the vehicle body W is performed on the base stand 2 in each of the processes.

Thus, when the transportation palette 1 reaches (is transported) the door attaching process G, the worker draws out the door D, which reaches the door transferring process K of the door sub assembly line B arranged to both sides thereof and completes the sub assembly, from the door palette P, and attaches the door D to the vehicle body W on the transportation palette 1. Thus, the vehicle body W, in which the door D is attached, is further transported to downstream of the vehicle body assembly line L.

Figure 2:
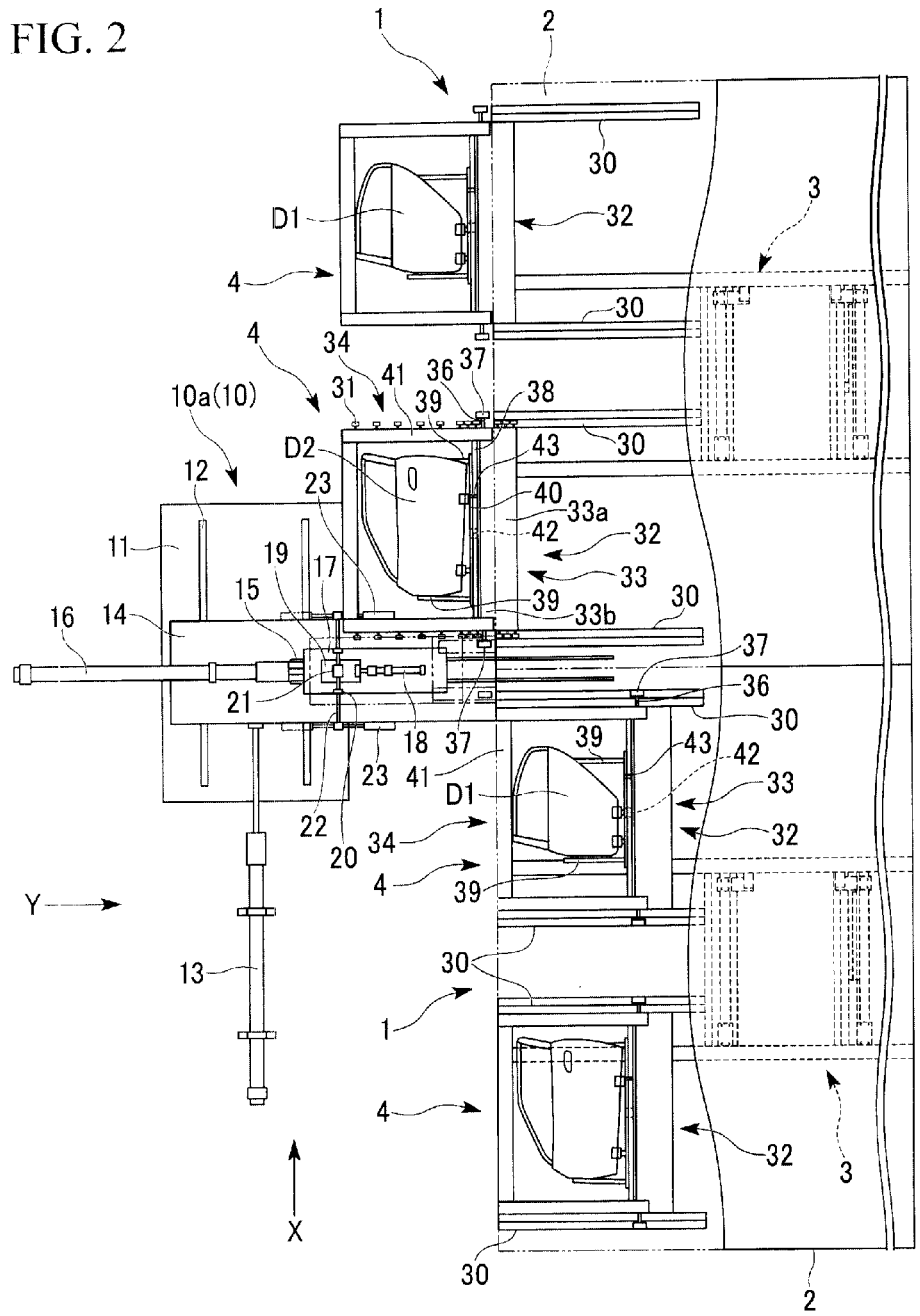
FIG. 2 is an explanatory plan view of a door transportation device in a vehicle body assembly line.

FIG. 2 is a plan view illustrating in a solid line the door receiving section 4 of the transportation palettes 1 and 1 adjoining to each other, a portion of which is cut away. In FIG. 2, the transportation palette 1 in the downstream side is illustrated in a state where the door receiving section 4 is received, and the transportation palette 1 in the upstream side is illustrated in a state where the door receiving section 4 is drawn out.

Figure 3:
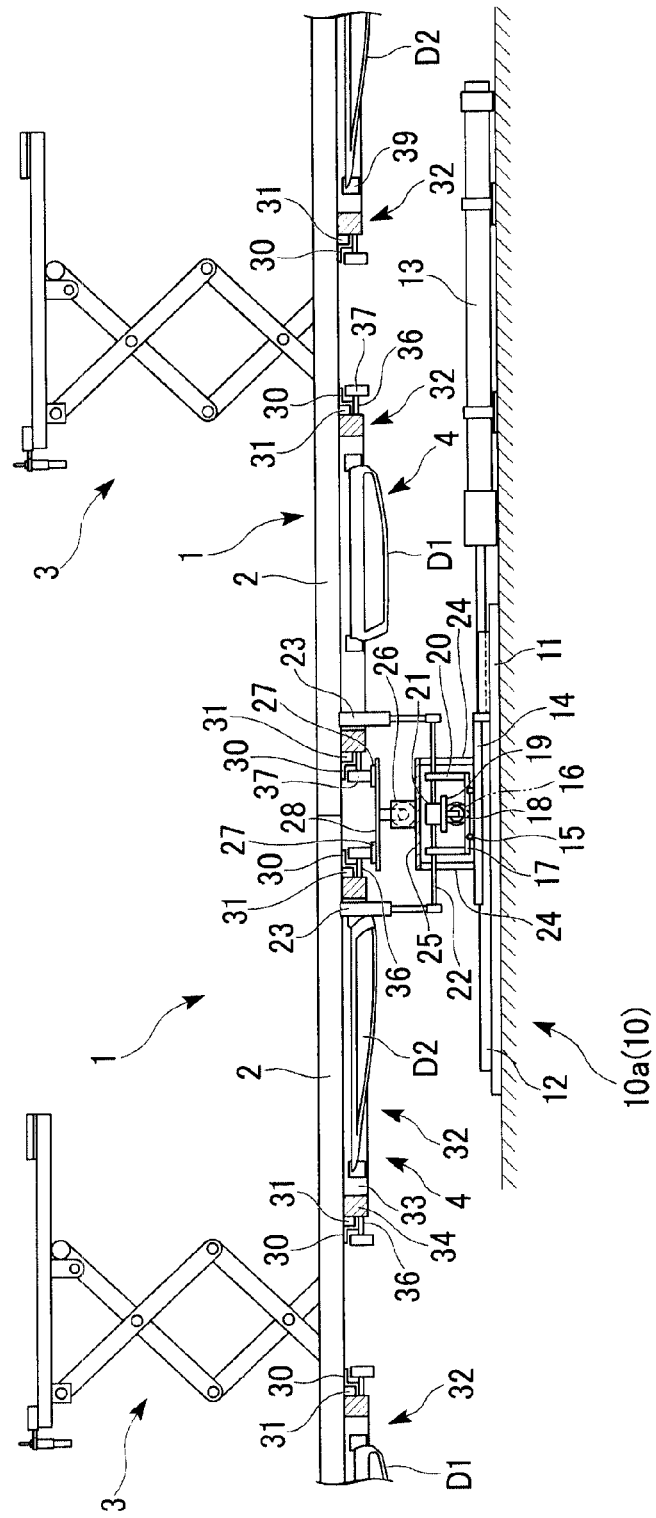
FIG. 3 is a view seen from an arrow Y of FIG. 2 and shows a cross-section of a portion of FIG. 2.
Figure 4:
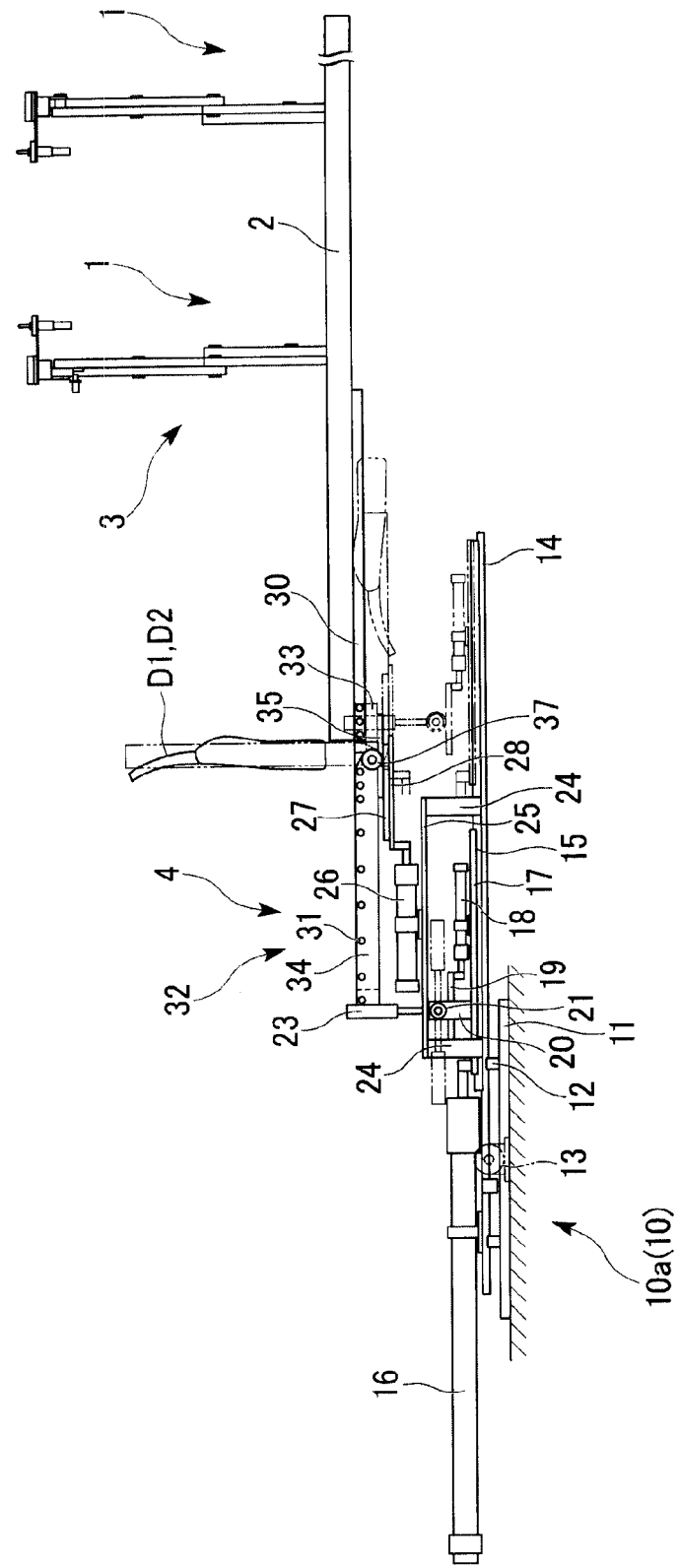
FIG. 4 is a view seen from an arrow X of FIG. 2.

Next, a door receiving section appearing and disappearing mechanism 10 (a door receiving section incoming and outgoing unit), which is appeared and disappeared to the base stand 2 of the transportation palette 1, is described, based on FIGS. 2 to 4.

The door receiving section appearing and disappearing mechanisms 10 are arranged at both sides to pinch the vehicle body assembly line L in positions corresponding to the door detaching process F and the door drawing out process M of the vehicle body assembly line L respectively. Specifically, the door receiving section appearing and disappearing mechanisms 10 are configured of door receiving section outgoing mechanisms 10a which are arranged to both sides to pinch the vehicle body assembly line L most near the upstream side and door receiving section incoming mechanisms 10b which are arranged to both sides to pinch the vehicle body assembly line L most near the downstream side, in the positions corresponding to the door detaching process F and the door drawing out process M respectively. Both are devices having the same structure so that the door receiving section outgoing mechanism 10a is described as an example.

The door receiving section outgoing mechanism 10a includes a first base stand 11. A first guide rail 12 is laid on the first base stand 11 parallel in the transportation direction of the vehicle body assembly line L. A second base stand 14, which slides via a linear cylinder 13, is arranged on the first guide rail 12. The second guide rail 15 is laid on the second base stand 14 in a direction to go directly to the vehicle body assembly line L. A third base stand 17, which slides via a first driving cylinder 16, is arranged on the second guide rail 15.

A second driving cylinder 18, which extends a rod in the direction to go directly to the vehicle body assembly line L, is provided on the third base stand 17. A rack gear 19, which moves in the direction to go directly to the vehicle body assembly line L, is provided on the rod of the second driving cylinder 18. A pair of support plates 20 and 20 is raised on the third base stand 17 and a pinion gear 21 of a support shaft 22, which is axially supported on the support plates 20 and 20, screws on the rack gear 19. Pressing members 23, which are capable of rising, are attached to both ends of the support shaft 22.

A fourth base stand 25 is provided on the second base stand 14 with four support plates 24 as legs. The support plates 24 of the fourth base stand 25 are arranged outside of the third base stand 17 and the support shaft 22 so as not to interfere with the third base stand 17 and the support shaft 22.

A third driving cylinder 26 is provided on the fourth base stand 25 so as to extend the rod in the direction to go directly to the vehicle body assembly line L. The support plate 28 is attached to the rod of the third driving cylinder 26 and a pair of rack gears 27, which moves in the direction to go directly to the vehicle body assembly line L, is attached to the upper surface of the support plate 28.

Next, the configuration of the door receiving section 4, which is attached to the base stand 2 of the transportation palette 1, is described. The door receiving sections 4 are provided on both sides of the end in the upstream side and the end in the downstream side of the vehicle body assembly line L respectively. A pair of guide rails 30 and 30 is laid in the lower surface of the base stand 2 in the direction to go directly to the vehicle body assembly line L. Rollers 31, 31, . . . of a door support frame 32 having a rectangular shape engage with the guide rails 30. Accordingly, the door receiving section 4, which has the plurality of rollers 31, 31, . . . engaging with the guide rails 30 and 30 on the both sides, is arranged so as to be freely appearing and disappearing the outside thereof with respect to the base stand 2. In addition, FIG. 2 illustrates the roller 31 only at a portion of the door receiving section 4.

The door support frame 32 is configured of a support section 33 and a rotation section 34 (see, FIG. 2). The support section 33 is formed of a base section 33a and an engaging section 33b, a tip of which is cut away. A frame body 41 having a U shape and configuring the rotation section 34 is engaged to the outside of the engaging section 33b by the rotation shaft 36. In this state, both side surfaces of the rotation section 34 and both side surfaces of the base section 33a of the supply section 33 become flush.

In addition, the support plate 35 is extended forward from the lower surface of the supply section 33 and supports the rotation section 34 (see, FIG. 4). The pinion gear 37 is fixed to the both sides of the rotation shaft 36 and the pinion gear 37 meshes the rack gear 27 of the door receiving section outgoing mechanism 10a.

The support plate 38 is disposed at the base end side of the frame body 41 of the rotation section 34. A door holding section 40, which has door support rods 39 in both sides thereof, is rotatably held on the support plate 38 by the rotation shaft 42. Usually, a fixing pin 43 engages the support plate 38 and the door holding section 40 and thereby the door D becomes a received state in the frame body 41.

Next, functions of the door receiving section appearing and disappearing mechanism 10 and the door receiving section 4 are described.

When the transportation palette 1 is transported near the door detaching process F, the linear cylinder 13 of the door receiving section outgoing mechanism 10a is operated and thereby the second base stand 14 becomes a synchronized state to move to the downstream side with the transportation palette 1 at the same time.

In this state, when the first driving cylinder 16 extends to move the third base stand 17 to an extension end and to operate the second driving cylinder 18 and thereby the rack gear 19 slides, the pinion gear 21 rotates and the pressing members 23 and 23 of both ends of the support shaft 22 displace from a horizontal state to the vertical state. Accordingly, the pressing members 23 and 23 rise inside the frame body 41 of the rotation section 34 of each of adjacent door receiving sections 4 of the adjacent transportation palettes 1 and 1 at the upstream side and the downstream side. After that, when the first driving cylinder 16 contracts, the adjacent door receiving sections 4 and 4 of the adjacent transportation palettes 1 and 1 become a protruded state that is drawn out from the base stand 2 of the transportation palette 1 to the outside respectively.

Next, the third driving cylinder 26 operates and thereby the rack gear 27 slides and the pinion gear 37, which engages with the rack gear 27, rotates. Accordingly, the rotation section 34 of each of door receiving sections 4 displaces from the horizontal state to the vertical state (see, a dot-dash line in FIG. 4). In this state, when a pin (not shown) protrudes from inside of the base stand 2 of the transportation palette 1, the rotation section 34 is suppressed from returning to the horizontal state and the vertical state of the rotation section 34 is maintained. At the same time, the second driving cylinder 18 is operated, the pinion gear 21 is rotated via the rack gear 19 and thereby the pressing members 23 and 23 are returned from the vertical state to the horizontal state and engagement with each of door receiving sections 4 is released.

Thus, the linear cylinder 13 is operated and the second base stand 14 is returned to an original position. As described above, when the second base stand 14 is returned to the original position, since the rack gear 27 has a groove along the transportation direction of the transportation palette 1, the engagement of the rack gear 27 and the pinion gear 37 is released smoothly.

The worker detaches the rear door D1 from the vehicle body W in the downstream side and the front door D2 from the vehicle body W in the upstream side on the transportation palette 1. The rear door D1 and the front door D2 are fastened by bolts between the door support rods 39 formed in the door holding section 40 of each of rotation sections 34 in the raised state. Here, the fastening is performed by inserting the bolt into a hinge hole and a door striker hole (not shown) of the rear door D1 and the front door D2, and a fastening hole (not shown) formed at the door support rod 39.

Next when the transportation palette 1 is transported near the door receiving section incoming mechanism 10b which is adjacent to the door receiving section outgoing mechanism 10a, the linear cylinder 13 operates and thereby the second base stand 14 becomes a synchronized state with the transportation palette 1 similar to the door receiving section outgoing mechanism 10a described above. At this time, the rack gear 27 in the door receiving section incoming mechanism 10b side meshes each of pinion gears 37 in the transportation palettes 1 and 1 side.

After that, the pin (not shown) is retreated inside the base stand 2 of the transportation palette 1 and thereby a lock of the rotation section 34 is released and the vertical state of the rotation section 34 is maintained by the rack gear 27 and the pinion gear 37.

Thus, the third driving cylinder 26 operates, the rack gear 27 slides, and thereby the pinion gear 37, which meshes the rack gear 27, rotates. Accordingly, the rotation section 34 of each of door receiving sections 4 displaces from the vertical state to the horizontal state. At this time, the first driving cylinder 16 is in a contracted state and the third base stand 17 positions at the contraction end. In this state, the second driving cylinder 18 is operated and thereby the rack gear 19 slides. Accordingly, the pinion gear 21 rotates and the pressing members 23 and 23 of both ends of the support shaft 22 are displaced from the horizontal state to the vertical state and thereby the pressing members 23 and 23 rise to the outside of the U-shaped frame body 41 of the rotation section 34 of each of door receiving sections 4 (see, FIG. 4).

Next when the first driving cylinder 16 is extended, each of door receiving sections 4 is received inside the base stand 2 of the transportation palette 1. At the same time, the second driving cylinder 18 is operated, the pinion gear 21 is rotated via the rack gear 10, the pressing members 23 and 23 return from the vertical state to the horizontal state, and the engagement with each of the door receiving sections 4 is released. Thus, the linear cylinder 13 is operated and the second base stand 14 is returned to the original position.

Thus, when the transportation palette 1 approaches the door drawing out process M, as described above, each of the adjacent door receiving sections 4 of the adjacent transportation palettes 1 and 1 is drawn out by the door receiving section outgoing mechanism 10a and the rotation section 34 is in the raised state, similar to the above description and thereby the worker releases the engagement by the bolt between the door support rod 39 formed in the door holding section 40 of the rotation section 34 and the door D, and transfers the door D to the door palette P which is standby at the door transferring process H of the door sub assembly line B. Thus, each of door receiving sections 4, which is drawn out, is received inside of each of transportation palettes 1 by the door receiving section incoming mechanism 10b which is adjacent to the door receiving section outgoing mechanism 10a, similar to the above description.

The rear door D1 and the front door D2, which complete the sub assembling in the door sub assembly line B, are detached from the door palette P in the door transferring process K and attach the vehicle body W placed on the lifting device 3 at the base stand 2 of the transportation palette 1 in the door attaching process G of the vehicle body assembly line L. Here, the rear door D1 and the front door D2, which are attached to the vehicle body W in the door attaching process G, are the rear door D1 and the front door D2 which are detached from the vehicle body W thereof in the door detaching process F of the vehicle body assembly line L. Accordingly, the door sub assembly line B synchronizes with the vehicle body assembly line L so that the rear door D1 and the front door D2, which are detached in the door detaching process F, are attached in good timing in the door attaching process G.

According to the embodiment described above, the door D, which detaches from the vehicle body W, is placed and transported on the door receiving section 4 arranged at the base stand 2 of the transportation palette 1 so that the door D detached from the vehicle body W can be transported by effectively using the transportation palette 1 transporting along the vehicle body assembly line L. Accordingly, production of the door transportation hanger for transporting the door D separately and the lay of the transportation conveyer are not necessary, wide space for the lay is also not necessary and low cost can be achieved.

The door D detaches from the vehicle body W in the door detaching process F which is the initial process of the vehicle body assembly line L, the door D is placed on the door receiving section 4 of the transportation palette 1 and the door D is transported to the downstream side of the vehicle body assembly line L. Accordingly, the door D detached from the vehicle body W can be transported to the door attaching process G only by performing the transportation of the vehicle body W, without need a special transportation hanger or a transportation conveyer.

The door transferring process H, which is the initial process of the door sub assembly line B, is arranged near the vehicle body assembly line L, and the door D, which is placed and transported on the door receiving section 4 of the transportation palette 1, is taken out from the door receiving section 4, and is transferred to the door palette P of the door sub assembly line B and thereby the door D can be transferred to the door sub assembly line B, which is arranged in the position near the vehicle body assembly line L, in a short path and quickly without the need to pass through the transportation conveyer or the like.

In addition, since the door D received in the door receiving section 4 does not protrude in the transportation direction of the transportation palette 1 without interfering with the transportation of the transportation palette 1, the length of the transportation line of the existing transportation palette 1 does not extend.

Thus, in the lower surface of the base stand 2 of the transportation palette 1 placing and transporting the vehicle body W in the vehicle body assembly line L, the pair of guide rails 30 and 30 is laid at both sides along the transportation direction, in other words, both sides of both ends in the transportation direction in the embodiment, and the door receiving sections 4, which have the plurality of rollers 31, 31, engaging with the guide rails 30 and 30 at both sides, are arranged so as to be freely appearing and disappearing of the outside thereof with respect to the base stand 2. Accordingly the door D is received compactly by only adding a hand to the transportation palette 1 and thereby it is not necessary to provide the transportation conveyer which transports the door D in a long path.

In addition, since the configuration is such that the horizontal state and the vertical state are displaceable in a state where the door receiving section 4 protrudes to the outside from the base stand 2, and since the door D can be in the vertical state, the work, in which the door D is received in the door receiving section 4 or the door D is taken out from the door receiving section 4, is easily performed while reducing the burden on the worker.

Thus, since the door receiving section 4 is appeared and disappeared by the door receiving section appearing and disappearing mechanism 10 to the outside of the base stand 2 of the transportation palette 1, the appearing and disappearing operation of the door D to the outside can be reliably performed.

Here, since the door receiving section appearing and disappearing mechanism 10 operates in synchronization with the transportation palette 1 of the vehicle body assembly line L, the appearing and disappearing operation of the door receiving section 4 by the door receiving section appearing and disappearing mechanism 10 does not give an adverse effect to the transportation operation of the transportation palette 1 and thereby the vehicle assembling process can be performed usually.

In addition, the invention is not limited to the embodiment described above and for example, the vehicle body assembly line L of the transportation type in which the vehicle body W is placed and transported on the transportation palette 1 is described as an example; however, the invention can be applied to a vehicle body transportation carriage of any type if it is a type in which the vehicle body W is placed and transported, and the door receiving section is provided.

What is claimed is:

1. A door transportation method in a vehicle body assembly line, in which the vehicle body is placed and transported on a vehicle body transportation carriage of a floor conveyer, and thereby components are assembled to the vehicle body, comprising:
    placing and transporting the door, which is detached from the vehicle body, on a door placing section, the door placing section being arranged on a lower surface of a base stand of the vehicle body transportation carriage and integrally installed with the base stand so as to be freely incoming and outgoing with respect to the base stand.

2. The door transportation method in a vehicle body assembly line according to claim 1, further comprising:
    detaching the door from the vehicle body; and
    placing the door on the door placing section of the vehicle body transportation carriage and transporting the door to a downstream side of the vehicle body assembly line.

3. The door transportation method in a vehicle body assembly line according to claim 2,
    wherein a door sub assembly line is arranged near the vehicle body assembly line, and
    wherein the method further comprises:
    drawing out the door which is placed and transported on the door placing section of the vehicle body transportation carriage from the door placing section; and
    transferring the door to a door transportation carriage of the door sub assembly line.

4. The door transportation method in a vehicle body assembly line according to claim 1,
    wherein a door sub assembly line is arranged near the vehicle body assembly line, and
    wherein the method further comprises:
    drawing out the door which is placed and transported on the door placing section of the vehicle body transportation carriage from the door placing section; and
    transferring the door to a door transportation carriage of the door sub assembly line.

5. The door transportation method in a vehicle body assembly line according to claim 1, further comprising:
    incoming and outgoing of the door placing section with respect to the base stand of the vehicle body transportation carriage by a door placing section incoming and outgoing unit.

6. A door transportation device in a vehicle body assembly line, comprising:
    a door placing section on which a door is placed and transported and which is arranged on a lower surface of a base stand of a vehicle body transportation carriage which places and transports a vehicle body in the vehicle body assembly line,
    wherein a pair of guide rails is laid on both sides along a transportation direction on the lower surface of the base stand, and
    wherein the door placing section has a plurality of rollers engaging the guide rails and is integrally installed with the base stand so as to be freely incoming and outgoing with respect to the base stand.

7. The door transportation device in a vehicle body assembly line according to claim 6,
    wherein, in an outside of the base stand, the door placing section is configured to be displaceable to a horizontal state and a vertical state.

8. The door transportation device in a vehicle body assembly line according to claim 7,
    wherein the door placing section is income and outgone with respect to the base stand of the vehicle body transportation carriage by a door placing section incoming and outgoing unit.

9. The door transportation device in a vehicle body assembly line according to claim 6,
    wherein the door placing section is income and outgone with respect to the base stand of the vehicle body transportation carriage by a door placing section incoming and outgoing unit.

10. The door transportation device in a vehicle body assembly line according to claim 6,
    wherein a door placing section incoming and outgoing unit operates in synchronization with the vehicle body transportation carriage of the vehicle body assembly line.

* * * * *